United States Patent
Rahman

(10) Patent No.: US 7,505,759 B1
(45) Date of Patent: Mar. 17, 2009

(54) SYSTEM FOR MESSAGE CONTROL AND REDIRECTION IN A WIRELESS COMMUNICATIONS NETWORK

(75) Inventor: Mohamed Anisur Rahman, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 09/336,756

(22) Filed: Jun. 21, 1999

(51) Int. Cl.
*H04L 12/58* (2006.01)
*H04B 7/00* (2006.01)

(52) U.S. Cl. .................. 455/412.2; 455/517

(58) Field of Classification Search ........... 455/412, 455/413, 414, 445, 417, 461, 561, 560, 553, 455/566, 556, 557, 517, 509, 412.1, 458, 455/466; 370/7.21, 7.3, 7.43; 704/270, 270.1, 704/260

See application file for complete search history.

(56) References Cited

U.S. PATENT DOCUMENTS

| | | | | |
|---|---|---|---|---|
| 5,448,759 A | * | 9/1995 | Krebs et al. | 455/54.1 |
| 5,487,175 A | * | 1/1996 | Bayley et al. | 455/54.2 |
| 5,673,256 A | * | 9/1997 | Maine | 370/271 |
| 5,905,777 A | | 5/1999 | Foladare et al. | |
| 6,044,260 A | * | 3/2000 | Eaton et al. | 455/406 |
| 6,061,718 A | * | 5/2000 | Nelson | 709/206 |
| 6,108,709 A | | 8/2000 | Shinomura et al. | |
| 6,201,959 B1 | * | 3/2001 | Kawashima | 455/412 |
| 6,233,430 B1 | * | 5/2001 | Helferich | 455/31.1 |
| 6,240,391 B1 | * | 5/2001 | Ball et al. | 704/270 |
| 6,249,808 B1 | * | 6/2001 | Seshadri | 709/206 |
| 6,263,212 B1 | * | 7/2001 | Ross et al. | 455/466 |
| 6,343,329 B1 | * | 1/2002 | Landgraf et al. | 709/206 |

FOREIGN PATENT DOCUMENTS

| | | |
|---|---|---|
| CA | 2225727 | 4/1997 |
| CA | 2213383 | 8/1997 |
| EP | 0 836 301 | 4/1998 |
| EP | 0 841 790 | 5/1998 |
| JP | 7-327218 | 12/1995 |
| JP | 9-270818 | 10/1997 |
| WO | WO 97/22936 | 6/1997 |
| WO | WO 98/15091 | 4/1998 |

OTHER PUBLICATIONS

*Dynamic Adaptation in an Image Transcoding Proxy for Mobile Web Browsing*, by Han et al., IEEE Personal Communications, Dec. 1998, pp. 8-17.

* cited by examiner

*Primary Examiner*—Melody Mehrpour

(57) ABSTRACT

A system for controlling and redirecting data messages includes a profiler for organizing profiles of characteristics of different mobile stations and a storage medium. The profiles include an alternate destination and at least one media format for the alternate destination. The system further includes a facilitator for facilitating routing of the data message based on an abstract or a preview of the data message.

39 Claims, 4 Drawing Sheets

SYSTEM FOR MESSAGE CONTROL AND REDIRECTION IN A WIRELESS COMMUNICATIONS NETWORK

FIELD OF THE INVENTION

The invention relates to wireless communication systems and more particularly to a system for message control and redirection in a wireless communications network.

BACKGROUND

A wireless data server extends e-mail messaging to subscribers of a wireless system. The conventional wireless data server typically supports message notification, delivery, and certain redirection mechanisms for mobile subscribers. However, the conventional wireless data server may not offer adequate previewing capabilities concerning the content of messages. Therefore, the subscriber is left to guess whether he should receive an entire data message immediately or redirect the entire data message for later review. If the subscriber guesses wrongly, the subscriber may misdirect crucial messages, while reviewing immaterial messages over valuable airtime of the mobile station. Thus, a need exists for providing the subscriber with a real-time preview of the contents of data messages.

A wireless service provider may configure a wireless data server to provide filtering of incoming data messages depending upon user preferences. However, ordinarily the subscriber has no provision for dynamically adjusting the filtering of incoming data messages immediately on demand. The subscriber typically must resort to the intervention of the wireless service provider to make any changes to the filtering of incoming data messages. Nevertheless, the subscriber is customarily charged for incoming data messages by U.S. wireless service providers. Incoming data messages may include content-provider data, advertisements, news updates, stock quotes, or other services. Thus, a need exists for providing the subscriber with the ability to switch on or off the incoming data messages on demand to avoid unwanted communication charges.

SUMMARY OF THE INVENTION

In accordance with the invention, a system for controlling and redirecting data messages includes a profiler for organizing profiles of characteristics of different mobile stations. The profiles include an alternate destination and at least one media format for the alternate destination. The system further includes a facilitator for facilitating routing of the data message based on an abstract or a preview of the data message. In one aspect of the invention, the facilitator comprises an abstract generator for generating abstract data on a received data message received at a wireless data server. The abstract generator generates the abstract in a media format suitable for presentation by a mobile station based on its profile. In another aspect of the invention, the facilitator comprises a preview supporter for generating a preview on a received data message received at the wireless data server. The preview supporter provides a preview in a media format suitable for presentation by a mobile station based on its profile. The preview, the abstract, or both are well-suited for allowing a subscriber, via his mobile station, to intelligently redirect, or otherwise handle, a data message represented by the preview or the abstract.

Furthermore, one aspect of the invention includes support of subscriber-controllable filtering on demand from a mobile station. Accordingly, from a mobile station a subscriber can dynamically change filtering of data messages at the wireless data server such that certain data messages may be blocked from transmission to the mobile station. The dynamic filtering allows a subscriber to reduce billable air-time or to reduce annoying e-mail advertisement messages.

DETAILED DESCRIPTION OF A PREFERRED EMBODIMENT

Figure 1:
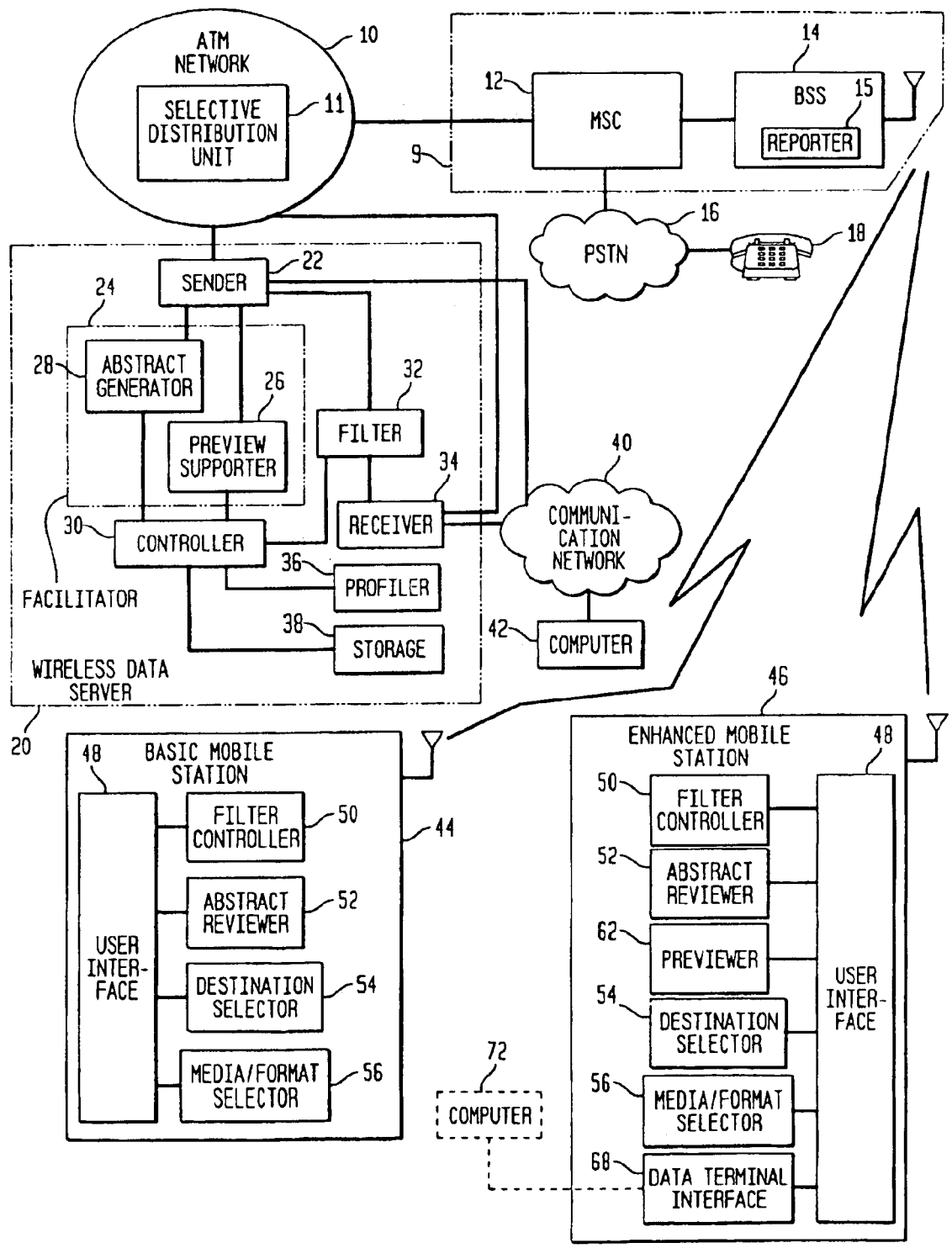
FIG. 1 is a block diagram of a communications system in accordance with the invention.

In accordance with the invention, in FIG. 1 a wireless data server 20 provides an interface between a communications network 40 and a wireless communications system 9. The communications network 40 (e.g., internet/intranet network) permits communications to one or more computers 42. The wireless communications system 9 supports communications with one or more mobile stations (44 or 46).

The wireless communications system 9 includes a mobile switching center (MSC) 12 coupled to a base station system 14. The base station system 14 is capable of electromagnetically communicating with the mobile station 44, the mobile station 46, or both. The MSC 12 is coupled to a public switched telephone network (PSTN) 16 and an asynchronous transfer mode (ATM) network 10. The PSTN 16 supports communications to one or more telephones 18 or other telecommunications devices.

Wireless Data Server

Figure 2:
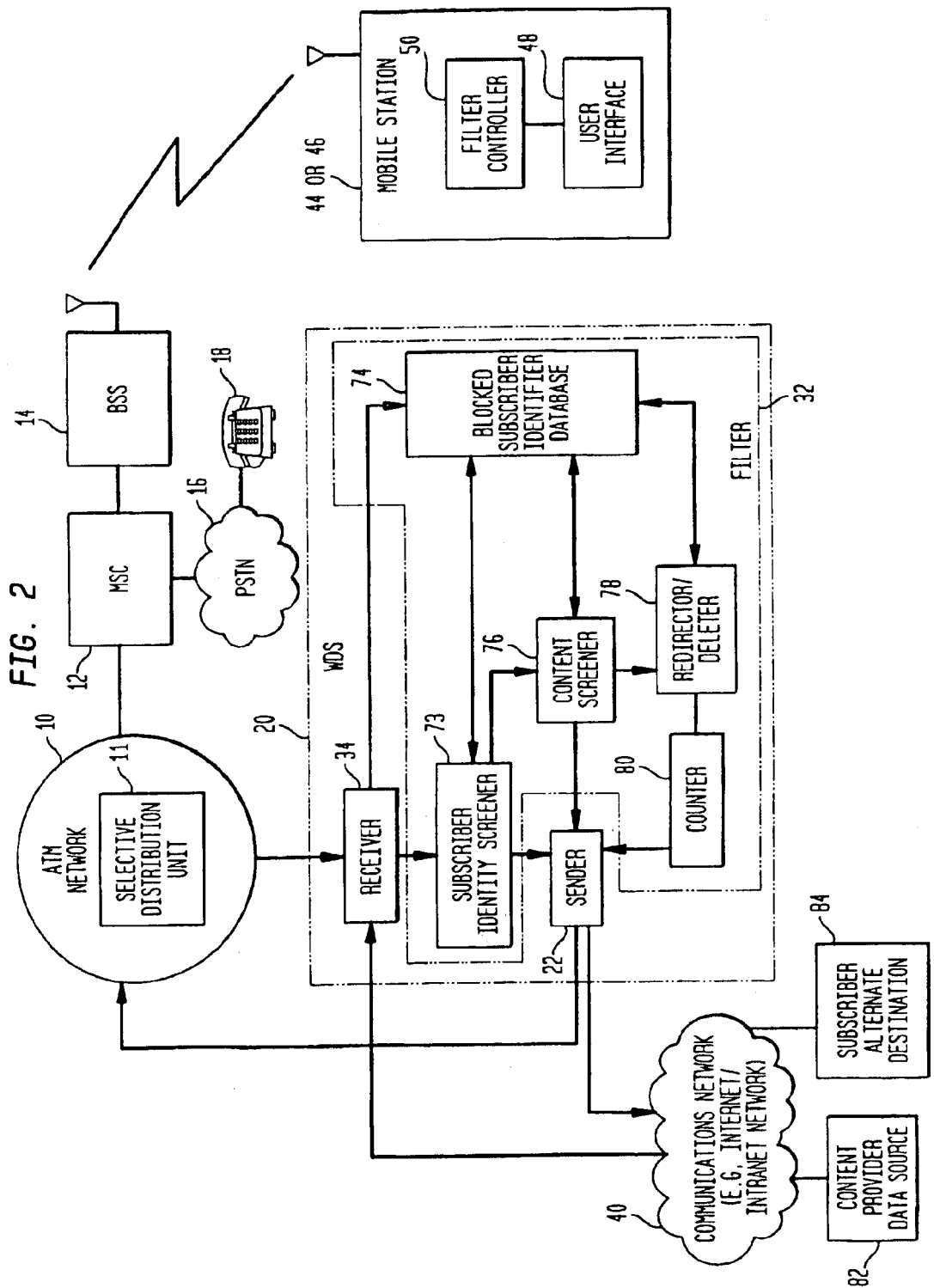
FIG. 2 is a block diagram of a communications system illustrating the filter in more detail than FIG. 1 does.

The wireless data server 20 is next described in greater detail in conjunction with FIG. 1 and FIG. 2. The wireless data server 20 includes a controller 30 for managing the processing and filtering of data messages. The controller is coupled to a facilitator 24, a filter 32, a profiler 36, and a storage media 38 via logical paths. The logical paths may represent one or more physical databuses. The filter 32 is intermediately coupled between a sender 22 and a receiver 34 of the wireless data server 20. The sender 22 may be coupled to an ATM network 10. The receiver 34 may be coupled to a communications network 40.

The facilitator 24 facilitates the subscriber's routing of a data message based on an abstract or a preview of the data message. The facilitator 24 includes an abstract generator 28, a preview supporter 26, or both. The abstract generator 28 generates abstract data on a received data message received at the wireless data server 20. The abstract is generated in a media format suitable for presentation by the mobile station 44 or 46 based on its profile. The preview supporter 26 generates a preview of a received message received at the wireless data server 20 for a mobile station 43.

The profiler 36 organizes profiles of characteristics of mobile station 44 or 46 and other communication parameters. The storage medium 38 stores the profiles including an alternate destination and at least one media format supported by the alternate destination.

The wireless data server 20 may further include a filter 32 for blocking transmission of the received data message to a particular mobile station 44 or 46 based on a mobile station identifier and a sender identifier of the received data message. Alternately, the filter 32 may block transmission of the received data message to a particular mobile station 44 or 46 based on a mobile station identifier and a content identifier extracted from the received data message.

The communications network 40 is generally characterized by greater available transmission capacity per subscriber than the wireless communications system 9 because the wireless communication channels are limited to an allotted frequency bandwidth. The wireless data server 20 transforms data from the communications network 40 to be compatible with the wireless communications system 9, and vice versa. Further, the wireless data server 20 includes a facilitator 24 and a filter 32 for enhancing the efficiency of communications over the wireless communications channels.

In the third generation of wireless or personal communications systems, of which FIG. 1 is representative, wireless packet data may be handled differently than circuit-switched traffic. Instead of the traffic going through the MSC 12 as classic circuit-switched traffic, data may be handled through the wireless data server 20 configured for data packet operation. The ATM network 10 interconnects the wireless data server 20 to the mobile switching center 12 (MSC). The mobile switching center 12 is equipped with a data packet communications interface for communicating over the ATM network 10 via data packets. The wireless data server 20 may route data to an Internet service provider (ISP), directly to the Internet, or to another communications network 40.

Profiler

The wireless data server 20 includes the profiler 36 for organizing profiles of different mobile stations 44 or 46. The profiles include characteristics of mobile stations and other related communication parameters. Each profile for a corresponding mobile station 44 or 46 may include one or more of the following: (1) configuration data on the mobile station, (2) supported media types and associated accompanying formats for the mobile station, (3) data terminal interface capability at the mobile station, (4) one or more alternate subscriber destinations for the mobile station, and (5) corresponding supported media and formats for each specified subscriber destination.

Configuration data on the mobile station generally includes information related to the software and hardware specifications of a corresponding mobile station. For example, configuration data may include a software version, hardware version, memory capacity, microprocessor capacity, display specifications available software features, modulation schemes, and data transmission protocols supported by a particular mobile station. The configuration data in each profile preferably includes data that indicates whether or not the previewer 62 is supported.

The display specifications represent an example of a hardware limitation of each mobile station. The display specifications may include the physical size, resolution (e.g., number of horizontal and vertical pixels), aspect ratio, supported colors, supported gray-scale features, or other display information.

The profiler 36 may maintain a profile database containing mobile station identifiers, mobile station characteristics, and authorized destinations. Further, each mobile station identifier the profile database may be associated with corresponding authorized destinations, at least one permissible media type per each destination, and at least one allowable format per each media type.

Each profile provides sufficient information for redirecting data messages for a particular mobile station or for appropriately preparing the format and media type to facilitate compatibility with a particular mobile station. With regards to message redirection, an authorized subscriber destination could represent a facsimile machine, a networked computer 42, a computer connected to the PSTN 16, a voicemail system, an e-mail system, another mobile station, or a subscriber-definable device. With regards to media type and format selection, the media type may include text, graphics, images, audio, application program files, attachments. Examples of formats for images includes any Joint Picture Experts Group (JPEG) is standard or any Moving Picture Experts Group (MPEG) standard.

Each subscriber will be assigned certain memory in the wireless data server 20, a gateway control server, an interworking function device, or another storage media for the purpose of maintaining a profile. The storage medium stores the profiles such that the wireless data server 20 can discern appropriate selections of destinations and media formats for each mobile station.

The profiler 36 accepts subscriber data entry, service provider data entry, or both. Subscriber access to certain data entries in the subscriber's profile is prohibited because the technical sophistication of the subscriber is assumed to be limited and such subscriber access might otherwise be disruptive to proper communications.

Although at least part of the profile could be entered remotely via the mobile station 43, the complete profile is preferably entered via network access (e.g., Internet access) to the wireless data server 20 to avoid using bandwidth of the wireless communications system.

Abstract Generator

The wireless data server 20 includes the abstract generator 28 that communicates to the profiler 36 directly or via a controller 30 as shown. The abstract generator 28 generates abstracts in formats that are presentable by the mobile stations based on their profiles. The profiler 36 may provide configuration data to the abstract generator 28 such that the transmission rate and data size of each abstract are commensurate with the transmission capacity or available bandwidth of the communications channel between the base station system 14 and the particular mobile station 44 or 46.

The abstract generator 28 is adapted to generate an abstract in a media format compatible with a particular mobile station. The abstract may be in text format, an image format, or an audio format depending upon the profile and the user interface 48. If the user interface 48 has a display and short-messaging service (SMS) is supported, the abstract will initially be sent as text. Otherwise, the abstract is preferably sent as audio, rather than an image format, to make efficient use of the radio frequency spectrum. The abstract generator 28 may include a text-to-speech transcoder for converting a text message into an audio abstract compatible with a particular mobile station (e.g., 44 or 46). Mobile stations 44 or 46 can readily support audio data messages without the processing intensity and power consumption required to process and display video images.

A computer 42, a telecommunications device 18, or a mobile station originate an intended data message addressed to a particular mobile station. The wireless data server 20 intercepts, receives, or otherwise holds the intended message under its direction in accordance with the profile for the addressed particular mobile station and any user input from the destination selector 52 or media/format selector 56. The abstract generator 28 extracts data from the received data message for a particular mobile station to construct an abstract addressed for delivery to the particular mobile station. The abstract generator 28 reads data messages awaiting delivery to a mobile station 43 or an alternate destination, to extract applicable information for an abstract.

The abstract generator 28 may extract event data to create an abstract. Event data originates from operating systems, windowing programs, application programs, or sender 22 input into e-mail applications. Event data and other applicable information for abstract formation may be found in a header or another known location within a data block of a data message. For instance, an author of an e-mail may use an application program on computer 42 that automatically incorporates his e-mail address the time message was transmitted into the header of a data message.

The abstract generator 28 may extract user-entered data in a data message to create an abstract. For instance, the application program may prompt the user of computer 42 for a title or subject heading. The foregoing information along with the length of the data message may be located in a header or another designated location in a data message transmitted to the wireless data server 20. Accordingly, the abstract generator 28 extracts such information from the header or another location within a data block of the data message and places the information in a audio or text format which is readily presented on the mobile station.

Preview Supporter

The wireless data server 20 includes a preview supporter 26 that communicates to the profiler 36 directly or via a controller 30 as shown. The preview supporter 26 generates previews in formats that are presentable by the mobile stations based on their profiles. The profiler 36 may provide configuration data to the preview supporter 26 such that the transmission rate and data size of each preview are commensurate with the transmission capacity or available bandwidth of the communications channel between the base station system 14 and the particular mobile station 44 or 46.

The preview supporter 26 supports the presentation of a preview of a received data message to a particular mobile station. The preview has a media format that corresponds to the characteristics of the particular mobile station. The preview supporter 26 cooperates with a previewer in the mobile station to permit the subscriber to observe a preview.

The preview supporter 26 generates a preview as an audio, textual, or image message compatible with a particular mobile station by extracting an excerpt from the received data message for delivery to the particular mobile station. A preview represents an excerpt of a message body of the received data message received at the wireless data server 20 and addressed to a particular mobile station.

The preview has a maximum excerpt size for a corresponding particular mobile station based on the profile of the particular mobile station. The preview supporter 26 is adapted to truncate the preview from a maximum excerpt size compatible with a mobile station 46 to a lesser excerpt size based upon wireless traffic activity measured before transmission of the preview to the mobile station 46. For example, the excerpt size may be limited based on the available wireless system capacity of the air interface within a particular coverage area.

The base station system 14 provides a subscriber traffic usage report to the controller 30 that can dynamically, limit, halt, or truncate any preview prior to the transmission of the maximum excerpt size, as otherwise permitted by the profile of a given mobile station 46. A base station system 14 includes traffic usage reporters 15 for determining if one or more base stations serving a certain coverage area meet or exceed threshold capacity that warrants overruling the maximum excerpt size. For example, if 70 percent of the traffic channels are in use for a given coverage area, the preview is limited a truncated excerpt size, instead of the maximum excerpt size based on the user profile. The above feature of truncating the preview from the maximum excerpt size is referred to as preemptive message truncation.

The preview, regardless of whether it is truncated or not, is preferably followed by a sign-off transmission warning indicating that the preview has been shortened from a complete data message and the subscriber should review the complete message by retrieval from his mailbox or an alternate destination. In sum, at the mobile station 43 the subscriber decides whether to evaluate the message based on the abstract, the preview, or both in accordance with the capabilities of the mobile station 43.

Filter

The wireless data server 20 includes the filter 32 interposed between a receiver 32 and a sender 22 to filter data messages. The filter 32 is configured for blocking transmission of the received data message to a particular mobile station based on a mobile station identifier and a sender 22 identifier of the received data message.

As best illustrated in FIG. 2, the filter 32 includes a database 74, a subscriber identifier screener 73, a content screener 76, and a redirector 78. Like elements in FIG. 1 and FIG. 2 represent like elements. Although the wireless data server 20 of FIG. 1 and FIG. 2 include all of the same block components, for clarity FIG. 2 only shows blocks for the filter 32 and related portions of the wireless data server 20.

The filter database 74 records blocked subscriber identities and blocked sender identities as defined based on subscriber input. The subscriber identifier screener 73 is adapted to identify any of the blocked subscriber identities in the received data message. Similarly, the content screener 76 is adapted to identify any of the blocked sender identifiers in the received data message.

The redirector 78 may redirect the received data message, upon identification as a blocked data message to be blocked, to an alternate destination. Instead of redirecting the received data message, the redirector 78 may delete the received data message, upon identification as a blocked data message to be blocked. A subscriber can determine whether blocked data messages are deleted or redirected via any computer connection to the wireless data server 20.

With respect to the filtering activity, received data messages may be classified as either a blocked message or a passed data message. The wireless data server 20 preferably includes a counter 80 for counting the number of blocked data messages per each mobile station 43 over a time interval to provide statistical or billing information for the service provider. The counter 80 is coupled to an output of the filter 32.

The filter 32 may be sensitive to the sender 22 identifier, a content identifier, or other factors. For example, the filter 32 can block the transmission of the received data message to a particular mobile station based on a mobile station identifier, a content identifier extracted from the received data message, or both. Furthermore, filtering operations may be based on sender 22 qualifications, time of day, and the existence of specific keywords contained in the message.

The filter 32 instructs a sender 22, directly or through the controller 30, on whether the sender 22 is permitted to transmit or forward a received data message addressed to a mobile station 44 or 46. The received data message refers to a data message which has been received by the wireless data server 20 or is otherwise under its direction. Even though the received data message is addressed to a mobile station and potentially awaits delivery to a mobile station, the intended data message is not necessarily transmitted to the mobile station, but rather its fate is under the direction the filter 32. Instead of delivering the intended data message via the sender 22, the filter may delete the data message, send the intended data message to a purge list, or otherwise handle the intended data message.

Sender

The sender 22 sends or forwards data messages to the mobile station 44 or 46 in a manner that conforms to the selected media and format. The sender 22 packages abstracts generated by the abstract generator 24, previews generated by the preview supporter 26 or both for transmission to one or more mobile units 44 or 46. If a preview or an abstract contains image data, high-fidelity audio data, or the like, the sender 22 may use a compression algorithm to compress the data in an amount suitable for transmission over the limited bandwidth of the air interface of the wireless system to the mobile station 44 or 46. Data compression of image data may involve reducing the number of colors in the image data to be transmitted to the mobile station 44 or 46 in accordance with a profile to conserve radio frequency bandwidth. Alternately, data compression may be accomplished by converting a color image to a grey-scale representation for transmission to the mobile station 44 or 46, which supports a grey-scale display according to its profile.

Controller

The controller 30 of the wireless data server 20 communicates with the abstract generator 28, the preview supporter 26, the receiver 34, the profiler 36 and the storage media 38 via logical data paths, which are realized by one or more physical databuses. The controller 30 includes a data processor for controlling and managing the operations of the wireless data server 20.

The controller 30 controls the components of the wireless data server 20 to manage the flow and routing of intended messages addressed to the mobile stations 44 or 46. The controller 30 cooperates with the previewer 62 to capture key characteristics of the data message for incorporation into the preview.

Upon receipt of a message for a mobile station 43, the receiver 34 provides the a recipient address of the data message to the controller 30, the controller 30 accesses the storage to retrieve the profile for the recipient address of the mobile station to determine whether abstract generation, previews, or both are supported. In a manner consistent with the retrieved profile, the controller 30 may invoke the abstract generator 28 or the preview supporter 26 to send an abstract or a preview, respectively, to the mobile station 43.

To support preemptive message truncation, the controller 30 may control and interrupt the preview supporter 26 based on input from a traffic usage reporter 15 for reporting a preemptive truncation signal to the controller 30. The reporter 15 generates a preemptive truncation signal for a mobile station identifier if a preview of the received data message is destined for a base station system 14 meeting or exceeding a threshold occupancy rate of all available downlink traffic channels within a coverage area for the mobile station 43 with the mobile station identifier.

Mobile Stations

Different classifications of mobile stations 44 or 46 are supported to provide subscriber screening of a data message via a brief abstract or to permit subscriber browsing of a data message through a previewer that presents more detailed information than the abstract. The basic mobile station 44 supports the presentation (e.g., viewing) of abstracts and selecting an appropriate destination of the underlying data message after or upon the presentation abstract. The enhanced mobile station 46 further supports the presentation of previews.

The basic mobile station 44 includes a user interface 48 which allows a user to communicate with the base station system 14 and ultimately with the wireless data server 20. The user interface 48 of the basic mobile station 44 is coupled to a filter controller 50, an abstract reviewer 52, a destination selector 54, and a media/format selector 56.

The enhanced mobile station 46 includes a user interface 48 which allows a user to communicate with the base station system 14 and ultimately with the wireless data server 20. The user interface 48 of the enhanced mobile station 46 is coupled to a filter controller 50, an abstract reviewer 52, a previewer 62, a destination selector 54, a media/format selector 56, and a data terminal interface 68. The data terminal interface 68 may be coupled (e.g., via an infra-red or light-wave frequency port) to a computer 72, such as a personal lap-top computer.

The enhanced mobile station 46 supports the previewing of a preview, the presentation of abstract information, or both in cooperation with a wireless data server 20. In contrast, the basic mobile station 44 supports the presentation of abstract information in cooperation with a wireless server 20. The mobile station (44, 46) includes an abstract reviewer 52 for reviewing abstract information on a held data message awaiting delivery to a mobile station, redirection to an alternate destination, archiving in a storage medium 38, or deletion from existence. The abstract reviewer 52 allows a subscriber to review an abstract that is in a presentable format for presentation by the mobile station (44, 46).

Destination Selector

The basic mobile station 44 or the enhanced mobile station 46 includes a destination selector 54. A destination selector 54 allows a subscriber to select a destination of the held data message after or while reviewing via the abstract reviewer 52. Similarly, the destination selector 54 allows a subscriber to select a destination of the held data message after or while reviewing a preview of the held data message. In an alternate embodiment, the destination selector 54 may allow a subscriber to select an authorized destination of the filter 32 with or without the review of an abstract or a preview.

The destination selector 54 may allow a subscriber to dynamically control the blocking/filtering function (of the filter 32) from a mobile station to prevent or is enable the receipt of content, advertisements, news updates, stock quotes, or other data. To this end, the mobile station 44 or 46 communicates via the base station system 14 to the wireless data server 20. At the wireless data server 20, the controller 30 may instigate changes in the operation of the filter 32 in accordance with dynamic subscriber input from the mobile station 44 or 46. Detailed filtering based on specific content, identifiers, or other preferences, may be available only through the computer access to the wireless data server 20, rather than access via a mobile station. However, the destination selector 54 at the mobile station has at least "on-off" capability for the blocking filter 32.

Media Format Selector

The basic mobile station 44 or the enhanced mobile station 46 includes a media/format selector 56. The media-format selector 56 permits a subscriber to select a presentation format for presenting the held data message at an authorized destination. Not only can the basic mobile station 44 select a destination (e.g., discard, home computer 42, home facsimile, etc), the basic mobile station 44 can select a media format. Examples of format are text, audio, image, video, audio recording, visual recording, facsimile, voicemail, and application program attachment. Not all of these formats may be available for each destination. The profiler 36 establishes the valid choices as set by the computer 42, preferably via the internet.

The abstract includes the author, date, title or subject, and time received, and type of message, if the information is available. Accordingly, the subscriber is able to readily reroute or discard some of the data messages based on their associated abstracts, without any need to receive the entire data messages over the limited radio frequency spectrum of the wireless communications system 9. For example, subscriber has the option of redirecting the data message to a fax-<capable destination, or audio-capable destination, via the MSC 12 or PSTN 16. The wireless data server 20 may also be equipped with the capability to convert messages to a digital audio file (e.g., a file in the wave or MIDI (musical instrument digital interface) format) for transferring through the packet network.

Enhanced Mobile Station

The enhanced mobile station 46 provides all of the features and functions of the basic station mobile station 44 plus a previewer 62. The previewer 62 cooperates with its counterpart at the wireless data server 20, the preview supporter 26. The previewer 62 allows the subscriber to view at least a portion of the actual corresponding data message. The size of the portion may be limited to that which fits onto one frame or screen of the display. The enhanced mobile station 46 is capable of handling a sufficient data volume of preview traffic by support a robust data throughput and data buffering mechanism. Thus, the previewer 62 provides additional information on the content of the data message in comparison to the abstract to make a better decision about routing the data message at the wireless data server 20.

Previewer

A previewer 62 permits a subscriber to preview at least an excerpt of the held data message prior to rerouting the held data message via the destination selector 54. The system further includes a previewer 62 for presenting a preview on a received data message in a media format suitable for presentation by the mobile stations 43 based on their profiles. Ideally, the preview would contain the size of the data message, content description, author, name, title, source description (e.g., an abstract of the source), summary, or at least part of the foregoing information. The previewer 62 allows a subscriber to decide whether a held data message should be sent, rerouted, redirected, or deleted. The subscriber can take action without the delay of receiving the entire data message. Because only a preview is sent, rather than a larger data message, traffic capacity of the wireless system 9 is readily reduced.

Data Terminal Interface

The enhanced mobile station 46 may also include a data terminal interface 68, which comprises a port for connection to a computer port to attain full access to an Internet/intranet network in a mobile environment. The data terminal interface 68 allows the wireless data server 20 to be a completed data message.

The data terminal interface 68 allows the wireless data server 20 to communicate a complete data message to a computer 72 coupled to the enhanced mobile station 46. The data terminal interface 68 provides a port adapted to communicate a data message from the wireless data server 20 with a computer 72 collocated with the enhanced mobile station 46.

In sum, a wireless data server 20 cooperates with a mobile 46 station to enable a subscriber to configure filtering, rerouting, deleting, archiving, or other actions remotely from the mobile station 46. Upon receipt of a message notification, a preview or an abstract, a subscriber can select an appropriate action from the mobile station 46 based on the subscriber's preferences. Different actions may be chosen for the message body and each of the included attachments of the data message.

A basic mobile station 44 or an enhanced mobile station 46 supports a subscriber's access to the source, heading, and size of the data message through a preview or at least an abstract. The provision of a preview or an abstract at the mobile station 43 (e.g., 44 or 46) allows the subscriber to be selective in handling messages. For example, after previewing a preview containing a part of a data message representing a part of a document (e.g., a title, an abstract, or an introduction), the subscriber is able to make an informed decision as to whether to receive the document or not.

Advantageously, the subscriber can decide to redirect the e-mail to some other system operating under less constrictive technical limitations than a mobile station 44 or 46 on a wireless communications system. From a mobile station 44 or 46, a subscriber may redirect an e-mail message to his office e-mail address, which the subscriber may access subsequently without incurring the expense of wireless airtime. If a subscriber finds a message useless, the subscriber can discard or delete it.

Message Control and Redirection

Figure 3:
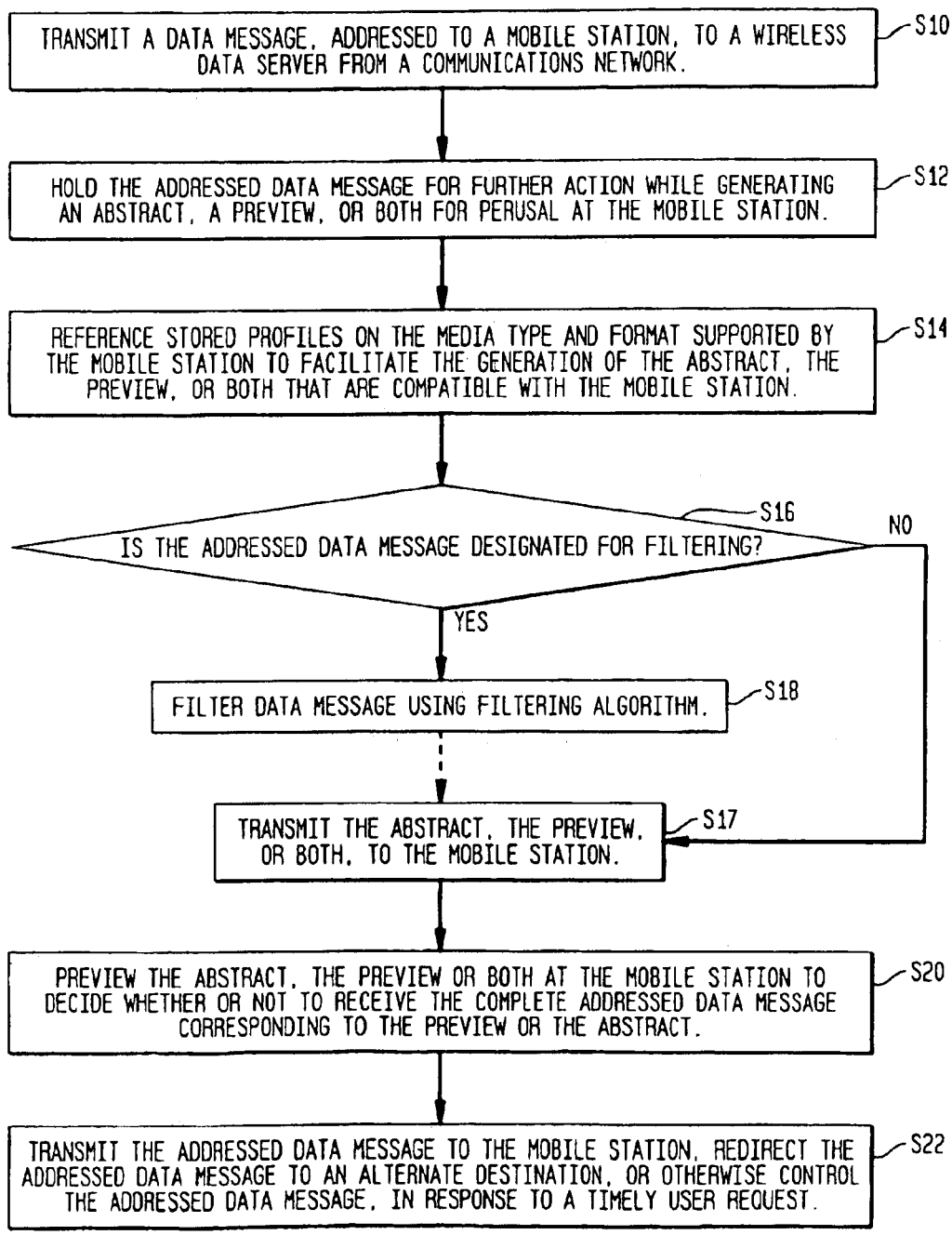
FIG. 3 is a flow chart of a method for controlling messages in a communications system in accordance with the invention.

FIG. 3 illustrates a flow chart of a method of message control, which may be used to redirect or otherwise handle an addressed data message addressed to a subscriber's mobile station (44, 46). Starting in step S10, a computer 42 (e.g., server) may transmit an addressed data message to the wireless data server 20 via the communications network 40. The wireless data server 20 includes a receiver 34 for receiving addressed data messages addressed to one or more subscribers of the mobile stations 44 or 46.

In step S12, a receiver 34 holds an addressed data message (or messages) for further action, while the facilitator 24 generates an abstract, a preview, or both associated with a corresponding addressed data message for perusal at the mobile station 44 or 46. Such further action may include delivery to the intended mobile station, redirection to an alternate destination, or deletion of the addressed data message.

Step S14 may be carried out simultaneously with step S12. In step S14, the facilitator references stored profiles on the media type and format supported by the mobile station to facilitate the generation of an abstract, the preview, or both that are compatible with the mobile station. The profiler 36 contains profiles of the mobile stations 44 or 46 and user preferences, which may be established partially or entirely through user input via a filter controller 50, a destination selector 54, and a media/format selector 56 at the mobile station 44 or 46. The profiles contain data such that the abstract or preview is appropriately formatted as voice data, text data, or image data for transmission to the mobile station 44 or 46. For example, the media/format selector 56 allows the mobile station to communicate a media type and a media format to the preview supporter 26 to update profiles or to provide user preferences on media and format types.

Following step S14 in step S16, the controller 30 determines if the addressed data message is designated for filtering in accordance with the filtering algorithm. If the addressed message is designated for filtering, the filter 32 filters the addressed message according to the filtering algorithm in step S18.

In step S18, instead of transmitting an abstract or a preview for a data message to a mobile station, certain data messages are filtered out in a manner that altogether prevents initial transmission to the mobile station 44 or 46. On the other hand, other data messages are filtered, but are merely passed through the filter 32, to permit the later transmission of an abstract, a preview, or complete data message to the mobile station 44 or 46. For example, while an addressed data messages of a general type (designated for filtering) may trigger a closer inspection by the filter 32, an over-riding filtering condition may dictate passing the addressed data message, abstract, or preview through the filter 32, even if the addressed data message otherwise satisfies some criteria associated with the general type of data message that is ordinarily filtered. The dashed lines connecting step S18 and S17 indicate the possibility of passing acceptable data messages, abstracts, or previews through the filter 32.

The filter 32 may redirect complete data messages, abstracts, previews, or all of the foregoing information to a designated alternate destination. Message redirection allows a subscriber to review a redirected data message from a computer associated with the alternate destination, for example. As another option, the filter 32 may delete unwanted data messages.

Steps S16 and S18 follow the generation of the abstract or the preview in step S12 and S14 such that the filtering step S16 may occur efficiently at the level of the abstract and the preview, as opposed to the entire underlying data message, to minimize processing of complete data messages and to permit a standard format for use in the filter 32.

According to step S18, the filter 32 can receive data messages from the receiver 34, abstracts from the facilitator, or previews from the facilitator and pass them on to the sender 22 or filter them in accordance with user preferences. The filter 32, in effect, blocks the passage of prohibited or restricted data messages to the sender 22. User preferences may be stored in the profiles. The controller 30 manages the operation of the filter 32 and the facilitator 24 by providing profile data as needed or upon request.

The mobile station 44 or 46 has a user interface 48 that allows a user to enter user input into the filter controller 50. The filter controller 50 communicates through the base station system 14 to control the operation of the filter 32 and the storage of the profiles required for appropriate operation of the filter 32.

If the addressed data message is not designated for filtering or if the addressed data message successfully passed through the filtering procedure of step S18, in step S17 the sender transmits the abstract, the preview, or both associated with the corresponding addressed data message to the mobile station. The transmission of the abstract, the preview, or both is triggered by the detection of the addressed message, the absence of removal by filtering, and the compliance with user profiles. A preview is only transmitted if supported by the mobile station (44, 46) to which the data message, underlying the preview, is addressed. By so limiting the transmission of previews by the sender 22, the wireless data server 20 is well-suited for conserving spectral resources, reducing electromagnetic interference, and enhancing wireless system capacity.

After step S17, the user previews the abstract, the preview, or both at the mobile station (44, 46) to decide whether or not to receive the complete addressed data message corresponding to the preview or the abstract. The abstract reviewer 52 supports the presentation of abstracts at the mobile station (44, 46) transmitted from the sender 22 and formatted by the abstract generator 28. A previewer 62 supports the presentation of previews at the mobile station 46 transmitted from the sender 22 and formatted by the preview supporter 26.

Based on the presentation of the abstract or the preview, the user of the mobile station 44 or 46 may request to receive the complete data message being held at the receiver 34, or otherwise awaiting disposition under the dominion of the wireless data server 20. If the user of the mobile station 44 or 46 does not request receipt of the complete data message within a predetermined time period, the complete message corresponding to the delivered abstract or preview is deleted from memory or a storage medium 38 of the receiver 34 within the wireless data server 20, for example.

In step S22, if the user requests the addressed data message, the sender 22 may transmit the addressed data message to the mobile station, redirect the addressed data message to an alternate destination, or otherwise control the addressed data message, in response to a timely user request. The mobile station 44 or 46 has a user interface 48 that allows a user to enter user input into an abstract reviewer 52, a destination selector 54, and/or a media/format selector 56. The destination selector 54 sends information to the profiler 36, which determines message redirection functionality of the sender 22. If appropriate, the sender sends the addressed data message to the mobile station 44 or 46, via the ATM network 10, the MSC 12 and BSS 14.

Although the illustrative example of FIG. 3 uses filtering after abstract or preview generation, in an alternate example of the method of the invention, the facilitator generates an abstract, a preview or both after filtering or pre-filtering. Accordingly, processing resources may be conserved by not generating abstracts, previews or both for certain addressed data messages that would be discarded or deleted anyway, as opposed to redirected as abstracts or previews.

Subscriber-Definable Filtering

Figure 4:
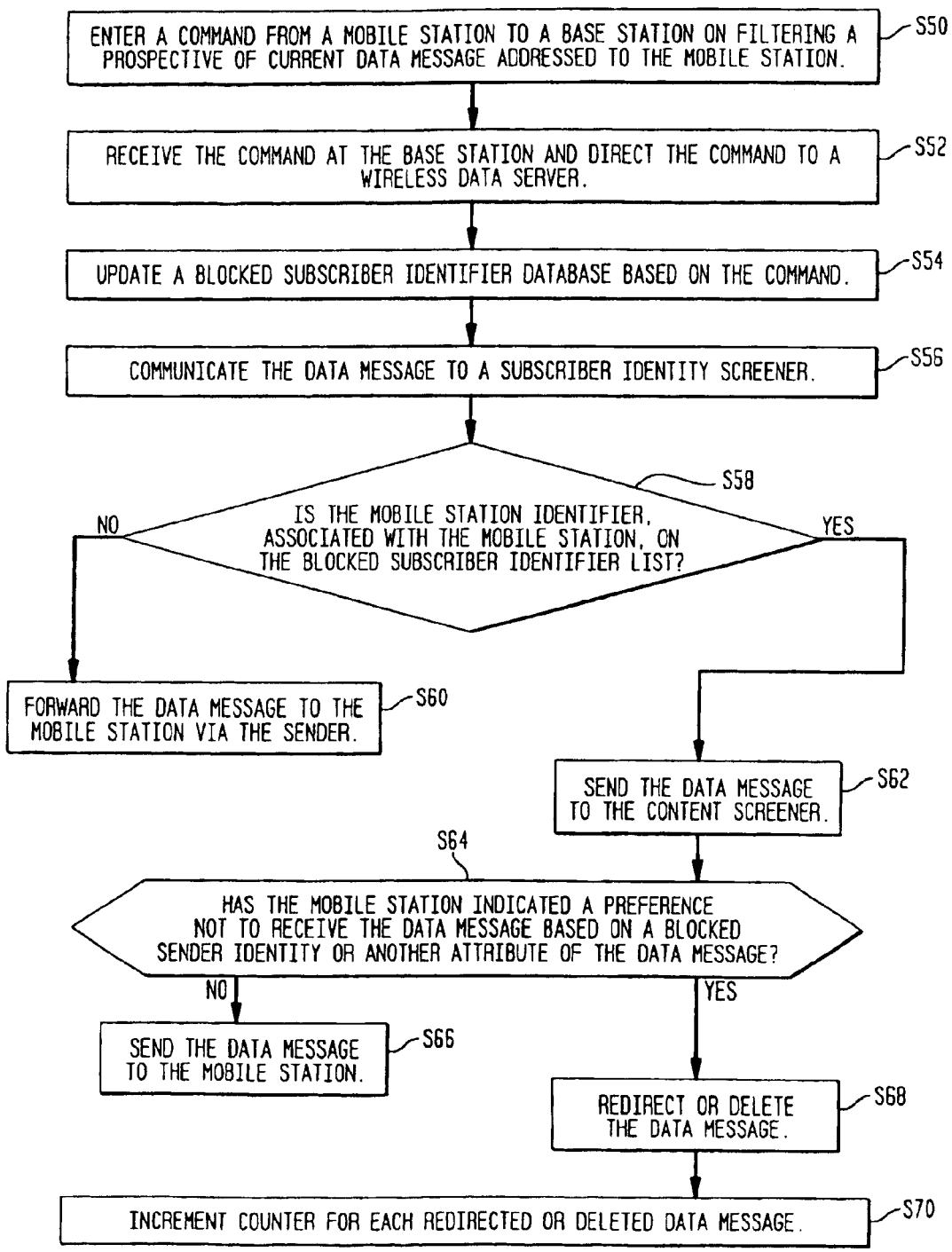
FIG. 4 is flow chart for filtering messages in a communications system in accordance with the invention.

FIG. 4 illustrates a method for facilitating subscriber-definable filtering with the filter 32 of the wireless data server 20, as best illustrated in FIG. 2. The method of FIG. 4 and filtering techniques are generally applicable to steps S16 and S18 of FIG. 3.

Starting in step S50, a subscriber enters a command from a mobile station (44,46) to a base station on filtering a prospective or current data message addressed to the mobile station (44, 46). The mobile station (44,46) includes a user interface 48 for entering commands on filtering to a filter controller 50. The filter controller 50 provides appropriate instructions to the filter 32, via the air interface, to carry out a subscriber's filtering commands and preferences.

The command may instruct the filter 32 to disable data messages from certain sources, with certain content, or other discriminating features supported by the wireless system. For example, the subscriber may chose to disable all advertisements which would otherwise be sent as data messages to his mobile station (44, 46). In the command, the subscriber may also specify whether disabled data messages are to be deleted or rerouted to an alternate destination specified by the subscriber for later viewing. The subscriber transmits the command as a coded message indicating the subscriber identifier, restricted content identifiers for disabled content, and rerouting data.

After step S50 in step S52, the base station system 14 receives the command and directs the command to a wireless data server 20. The command is directed through the MSC 12 and the ATM network 10 to the wireless data server 20. The ATM network 10 may include a selective distribution unit 11 for facilitating communication between the MSC 12 and the wireless data server 20. At the wireless data server 20, a receiver 34 receives the coded message representing the command.

In step S54, the wireless data server 20 updates a blocked subscriber identifier database 74 (FIG. 2) based on the command. The blocked subscriber identifier database 74 contains blocked subscriber identifiers and corresponding content identifiers for blocked content. The sender 22 may send an acknowledgement back to the mobile station that the blocked subscriber database 74 has been updated.

Assume that a content provider data source 82 (FIG. 2) now tries to transmit a data message to the mobile station, which may or may not have a blocked subscriber identifier. The receiver 34 receives the data message from the content provider data source 82.

In step S56, the receiver 34 communications the data message to a subscriber identity screener 73. The subscriber identity screener 73 looks at the mobile station identifier associated with the mobile station to which the data message is addressed.

In step S58, the subscriber identity screener 73 determines if the mobile station identifier, associated with the mobile station (44, 46), is on the blocked subscriber identifier list in the blocked subscriber identifier database 74. If the mobile station identifier is on the blocked subscriber identifier list, the data message is sent to the content screener 76 in step S62. However, if the mobile station identifier is not on the blocked subscriber identifier list, the subscriber identity screener 73 forwards the data message to the sender in step S60. Further, the sender 22 sends the data message to the mobile station (44, 46) with the mobile station identifier.

Following step S62 in step S64, the content screener 76 determines if the mobile station has indicated a preference not to receive the data message on a blocked sender identity or another attribute of a data message. A subscriber at the mobile station (44, 46) may indicate such a preference through a command, for example.

The content screener 76 looks at the sender identity, as opposed to the recipient mobile station identity to whom the data message is addressed. The content screener 76 determines whether the mobile station 43 has indicated not to receive the information based on detection of the blocked sender identity in the data message. Alternately, the content screener 76 may look to other attributes of the data message other than sender identity. Other attributes of a data message may be found in a header or trailer of a data message to determine whether or not to block the data message intended for the mobile station identifier.

If the content screener 76 decides that the content has not been prohibited by the recipient subscriber, the data message is provided to the sender 22 for transmission to the appropriate mobile station in step S66.

However, if the content screener 76 decides that the content is prohibited, the content screener 76 forwards the message to the redirector 78 or redirector/deleter in step S68. The redirector 78 looks at the blocked subscriber identifier database 74 for any redirection data associated with the subscriber identifier. If no redirection data is found, the redirector 78 may be setup to redirect data to a default location (e.g., the subscriber alternate destination 84) or the redirector 78 may be setup to delete the data message. If redirection data is found, the redirection data may require reference to the profiler 36 to determine a complete appropriate address for the subscriber alternate destination 84. Once the complete appropriate address is determined, the redirector 78 communicates the message with an updated destination address for the alternate destination to the sender 22.

In step S70 after or during step S68, for any blocked or redirected message, a counter 80 may be incremented for each subscriber and tracked by mobile station identifier for billing purposes such that use of the wireless data server's resources for blocking calls may be billed to subscribers, if desired. Moreover, the counter 80 data is useful for identifying disproportionate or inappropriate use of the system resources.

In sum, the filter 32 responds to the filter controller 50 to allow dynamic changes in filtering as commanded from a mobile station in communication with the wireless data server 20. The filter 32 controller 30 in the mobile station and the filter 32 in the wireless data server 20 cooperate to prevent prohibited messages from ever being transmitted by the base station system 14. Advantageously, prohibiting transmission of the data messages conserves limited spectral resources and may even increase the signal-to-noise ratio performance of the communications system through data traffic reduction.

A subscriber at a mobile station is able to dynamically change filtering of data messages at the wireless data server 20 such that certain data messages may be blocked from transmission to the mobile station. The dynamic filtering allows a subscriber to reduce billable air-time and reduce annoying e-mail advertisement messages. In another aspect of the invention, the mobile station 44 or 46 receives a preview as an excerpt of a data message. The preview is well-suited allowing a subscriber to intelligently redirect, or otherwise handle, a data message represented by the preview.

In accordance with the invention, a system for controlling and redirecting data messages facilitates the subscriber's informed decision to route, delete, or redirect a data message held under the direction of the wireless data server 20 for potential transmission to the subscriber's mobile station 44 or 46. The system provides the subscriber with the capability to preview an abstract or an excerpt representative of a data message held at the wireless data server 20 for potential transmission to the subscriber's mobile station. For example, a held data message may be stored in the storage medium 38 of wireless data server 20 which may be segregated into mailboxes corresponding to subscriber mobile station identifiers. The available traffic capacity of the wireless communications system (e.g., base station system 14 and mobile station 44 or 46) may be increased by transmitting a preview or an abstract, as opposed to a complete data message, to support rerouting of the preview or the abstract to an alternate destination. From a mobile station 44 or 46, a subscriber may disable, enable, or otherwise dynamically adjust filter settings for filtering data messages addressed to the mobile station 44 or 46 without having to evaluate a preview or an abstract. The filter settings of the filter 32, in effect, allow the wireless data server 20 to evaluate data messages for the subscriber, and to take appropriate actions, such as deleting or rerouting data messages.

This specification describes various illustrative embodiments of the system and method of the present invention. The scope of the claims is intended to cover various modifications and equivalent arrangements of the illustrative embodiments disclosed in the specification. Therefore, the following claims should be accorded the reasonably broadest interpretations to cover the modifications, equivalent structures, and features which are consistent with the spirit and the scope of the invention disclosed herein.

I claim:

1. A system for controlling and redirecting data messages comprising:
   a profiler for organizing profiles of characteristics of different mobile stations;
   a storage medium for storing the profiles including an alternate destination and at least one media format supported by the alternate destination; and
   an abstract generator for generating abstract data, which is an abstract of a received data message, for delivery to the mobile stations in a media format suitable for presentation by the mobile stations based on their profiles,
   the abstract data including an actual excerpted portion of the content of the received data message.

2. The system according to claim 1 further comprising:
   a filter for blocking transmission of the received data message to a particular mobile station based on a mobile station identifier and a sender identifier of the received data message.

3. The system according to claim 1 further comprising:
   a filter for blocking transmission of the received data message to a particular mobile station based on a mobile station identifier and a content identifier extracted from the received data message.

4. The system according to claim 1 further comprising:
   a preview supporter for presenting a preview of a received data message to a particular mobile station, the preview corresponding to said characteristics of the particular mobile station.

5. The system according to claim 1 further comprising:
   a previewer for previewing an excerpt of the received data message addressed to a particular mobile station, the excerpt having a maximum excerpt size based on one of said organized profiles.

6. The system according to claim 5 further comprising:
   a controller for controlling the previewer;
   a reporter for reporting a preemptive truncation signal to the controller for a mobile station identifier if a preview of the received data message is destined for a base-station system meeting or exceeding a threshold occupancy rate of all available downlink traffic channels within a coverage area for the mobile station with the mobile station identifier.

7. The system according to claim 1 wherein a preview supporter for truncating an excerpt of the received data message initially having a maximum excerpt size compatible with a mobile station to a lesser excerpt size before transmission of the excerpt to the mobile station.

8. The system according to claim 1 further comprising:
   a preview supporter for generating a textual message compatible with a particular mobile station by extracting an excerpt from the received data message for delivery to the particular mobile station with an organized one of the profiles.

9. The system according to claim 1 further comprising:
   an abstract generator for generating an audio abstract compatible with a particular mobile station by extracting an excerpt from the received data message addressed for delivery to the particular mobile station with an organized one of said profiles.

10. The system according to claim 1 further comprising:
    a filter including a database for recording blocked subscriber identities and blocked sender identities as defined based on subscriber input, a subscriber identifier screener for identifying any of said blocked subscriber identities in the received data message,
    a content screener for identifying any of said blocked sender identifiers the received data message, and
    a redirector for redirecting the received data message, upon identification as a blocked data message to be blocked, to an alternate destination.

11. The system according to claim 1 further comprising:
    a filter including a database for recording blocked subscriber identities and blocked sender identities as defined based on subscriber input, a subscriber identifier screener for identifying any of said blocked subscriber identities in the received data message, a content screener for identifying any of said blocked sender identifiers the received data message, and a redirector for deleting the received data message, upon identification as a blocked data message to be blocked, to an alternate destination.

12. The system according to claim 1 further comprising:
    a filter for classifying the received data message as a blocked message or a passed data message;
    a counter for counting the number of blocked data messages per each mobile station over a time interval, the counter coupled to an output of said filter.

13. A mobile station for use in a system for message control and redirection, the mobile station comprising:
    an abstract reviewer for reviewing abstract information, the abstract information being an abstract of a held data message at the system, the abstract information being in a presentable format for presentation by the mobile station, the abstract information including an actual excerpted portion of the content of the held data message;
    a destination selector for selecting a destination of the held data message with or without reviewing via the abstract reviewer; and
    a media-format selector for selecting a presentation format for presenting the held data message at the destination.

14. The mobile station according to claim 13 further comprising:
    a previewer for previewing at least an excerpt of the held data message prior to rerouting the held data message via the destination selector.

15. The mobile station according to claim 13 further comprising:
    a previewer for previewing at least an excerpt of the held data message prior to deleting the held data message via the destination selector.

16. The mobile station according to claim 13 further comprising:
    a data terminal interface for communicating the held data message after receipt to a port adapted to communicate the received data message with a computer.

17. A system for controlling and redirecting data messages comprising:
- a profiler for organizing profiles of characteristics of different mobile stations;
- a storage medium for storing the profiles including an alternate destination and at least one media format supported by the alternate destination; and
- a preview supporter for generating a preview, which is an actual excerpt of the content of a received data message for delivery to the mobile stations in a media format suitable for presentation by the mobile stations based on their profiles.

18. The system according to claim 17 further comprising:
- a filter for blocking transmission of the received data message to a particular mobile station based on a mobile station identifier and a sender identifier of the received data message.

19. The system according to claim 17 further comprising:
- a filter for blocking transmission of the received data message to a particular mobile station based on a mobile station identifier and a content identifier extracted from the received data message.

20. The system according to claim 17 wherein the preview has a maximum excerpt size based on one of said organized profiles.

21. The system according to claim 17 wherein the preview supporter is adapted to truncate the preview from a maximum excerpt size compatible with a mobile station to a lesser excerpt size based upon wireless traffic activity measured before transmission of the excerpt to the mobile station.

22. The system according to claim 17 wherein the preview supporter generates a textual message, as the preview, compatible with a particular mobile station by extracting an excerpt from the received data message.

23. The system according to claim 17 further comprising:
- a filter including a database for recording blocked subscriber identities and blocked sender identities as defined based on subscriber input,
- a subscriber identifier screener for identifying any of said blocked subscriber identities in the received data message,
- a content screener for identifying any of said blocked sender identifiers the received data message, and
- a redirector for redirecting the received data message, upon identification as a blocked data message to be blocked, to an alternate destination.

24. A system for controlling and redirecting data messages comprising:
- a profiler for organizing profiles of characteristics of different mobile stations;
- a storage medium for storing the profiles including an alternate destination and at least one media format supported by the alternate destination; and
- a preview supporter for generating a preview, which is an actual excerpt of the content of a received data message, for delivery to a particular mobile station, the preview supporter adapted to place the preview in a format suitable for presentation by the particular mobile station based on its profile.

25. The system of claim 24 wherein the preview comprises an image data message extracted as an excerpt from the received data message.

26. The system of claim 24 wherein the preview comprises a textual data message extracted as an excerpt from the received data message.

27. The system of claim 24 wherein the preview comprises an audio data message extracted as an excerpt from the receive data message.

28. The system of claim 24 wherein the preview has a maximum excerpt size corresponding to the particular mobile station based on its profile.

29. The system of claim 28 wherein the preview supporter is adapted to truncate a preview from the maximum excerpt size compatible with a mobile station to a lesser excerpt size based upon wireless traffic activity.

30. A mobile station for use in a system for message control and redirection, the mobile station comprising:
- a previewer for previewing a held data message at the system, the preview being an actual excerpt of the content of the held data message in a presentable format for presentation by the mobile station;
- a destination selector for selecting a destination of the held data message with or without reviewing the preview via the previewer; and
- a media-format selector for selecting a presentation format for presenting the held data message at the destination.

31. The mobile station according to claim 30 wherein the previewer is adapted to present the preview as an excerpt of the held data message in a media format based on the profile of the mobile station.

32. The mobile station according to claim 30 wherein the previewer is adapted to display the preview as a textual excerpt of the held data message in a media format based on the profile of the mobile station.

33. The mobile station according to claim 30 wherein the previewer is adapted to display the preview as an image excerpt of the held data message in a media format based on the profile of the mobile station.

34. The mobile station according to claim 30 wherein the previewer is adapted to display the preview as an audio excerpt of the held data message in a media format based on the profile of the mobile station.

35. The mobile station according to claim 30 wherein the preview contains a size of the held data message, a content description of the held data message, and an author of the held data message.

36. The mobile station according to claim 30 wherein the preview contains a size of the held data message, a content description of the held data message, and a source description of the held data message.

37. The system of claim 30 wherein the preview has a maximum excerpt size corresponding to the mobile station based on its profile.

38. The system of claim 37 wherein the previewer is adapted to truncate a preview from the maximum excerpt size compatible with a mobile station to a lesser excerpt size based upon wireless traffic activity.

39. A system for controlling and redirecting data messages comprising:
- a profiler for organizing profiles of characteristics of different mobile stations;
- a storage medium for storing the profiles including an alternate destination and at least one media format supported by the alternate destination; and
- an abstract generator for generating abstract data, which is an abstract of a received data message, for delivery to the mobile stations in a media format suitable for presentation by the mobile stations based on their profiles, the abstract data including an actual excerpted portion of the body of the received data message.

* * * * *